(12) United States Patent
Vella et al.

(10) Patent No.: US 11,261,341 B2
(45) Date of Patent: Mar. 1, 2022

(54) CONDUCTIVE INK COMPOSITION AND ARTICLE OF MANUFACTURE MADE THEREFROM

(71) Applicant: XEROX CORPORATION, Norwalk, CT (US)

(72) Inventors: Sarah J. Vella, Milton (CA); Yujie Zhu, Mississauga (CA); Gregory McGuire, Oakville (CA)

(73) Assignee: XEROX CORPORATION, Norwalk, CT (US)

( * ) Notice: Subject to any disclaimer, the term of this patent is extended or adjusted under 35 U.S.C. 154(b) by 272 days.

(21) Appl. No.: 16/405,806

(22) Filed: May 7, 2019

(65) Prior Publication Data

US 2020/0354600 A1    Nov. 12, 2020

(51) Int. Cl.
| | | |
|---|---|---|
| C09D 11/52 | (2014.01) | |
| C09D 11/0235 | (2014.01) | |
| C09D 11/102 | (2014.01) | |
| B41M 1/12 | (2006.01) | |
| H01B 1/22 | (2006.01) | |

(52) U.S. Cl.
CPC .......... *C09D 11/52* (2013.01); *C09D 11/0235* (2013.01); *C09D 11/102* (2013.01); *B41M 1/12* (2013.01); *H01B 1/22* (2013.01)

(58) Field of Classification Search
CPC .................................................. C09D 11/52
See application file for complete search history.

(56) References Cited

U.S. PATENT DOCUMENTS

| | | |
|---|---|---|
| 6,008,296 A | 12/1999 | Yang et al. |
| 8,158,032 B2 | 4/2012 | Liu et al. |
| 10,072,177 B2 * | 9/2018 | Burrows .............. H05K 1/0326 |
| 10,995,232 B2 * | 5/2021 | Cao ......................... C09D 11/52 |
| 2016/0035910 A1 * | 2/2016 | Wu ......................... C09D 11/52 |
| | | 136/256 |

FOREIGN PATENT DOCUMENTS

| | | |
|---|---|---|
| WO | 99/45077 A1 | 9/1999 |
| WO | 2004/069941 A2 | 8/2004 |
| WO | 2012/028686 A2 | 3/2012 |
| WO | WO 2014/113937 A1 | 7/2014 |
| WO | 2016/073465 A1 | 5/2016 |

OTHER PUBLICATIONS

BYK-307 Data Sheet, Silicone-containing surface additive for solvent-free and solvent-borne coating systems, printing inks and adhesive systems, with strong reduction of surface tension. Very good substrate wetting, prevents cratering, and increases surface slip. Solvent-free alternative to BYK-306, Nov. 2012, 4 pages.

(Continued)

*Primary Examiner* — William D Young
(74) *Attorney, Agent, or Firm* — MH2 Technology Law Group LLP (57) ABSTRACT

An ink composition comprises a thermoplastic polyurethane; particles comprising silver; and at least one diluent liquid. The thermoplastic polyurethane has the property of exhibiting an elongation at break ranging from about 200% to about 1500% at 23° C. when in pure polymer form.

20 Claims, 5 Drawing Sheets

(56) References Cited

OTHER PUBLICATIONS

OMNEXUS, "Elongation at Break or Fracture Strain: Technical Properties of Plastics," downloaded on Jan. 28, 2019 at https://omnexus.specialchem.com/polymer-properties/properties/elongation-at-break, 12 pages.

Lubrizol ESTANE®5703 Ester Based Thermoplastic Polyurethane Data Sheet, downloaded on Jan. 28, 2019 at http://www.matweb.com/search/datasheet_print.aspx?matguid=0c4c562426e64d768e3ee5d294da5fbc, 2 pages.

Estane®5703 TPU Lubrizol (Thermoplastic Polyurethane Elastomer (Polyester) Data Sheet supplied by Lubrizol Advanced Materials, Inc., downloaded on Jan. 28, 2019 at https://plastics.ulprospector.com/datasheet/e122063/estane-5703-tpu, 3 pages.

HUNTSMAN Technical Data Sheet Irostic® S 8612, updated Dec. 2011, 1 page.

HUNTSMAN Technical Data Sheet Irostic® S 8743 updated Dec. 2011, 1 page.

LUBRIZOL Pearlstick™ 5703 Technical Data sheet, The Lubrizol Corporation 2018, 1 page.

HUNTSMAN, Adhesive Thermoplastic Polyurethanes, Irostic®, Huntsman Corporation, 2008, 3 pages.

Pusch et al., "Large volume syringe pump extruder for desktop 3D printers," HardwareX 3(2018) 49-61.

Requisition dated Jun. 2, 2021 in corresponding Canadian Application No. 3,080,298, 4 pages.

Extended European Search Report dated Sep. 29, 2020 in corresponding European Application No. 20173071.0, 9 pages.

\* cited by examiner

CONDUCTIVE INK COMPOSITION AND ARTICLE OF MANUFACTURE MADE THEREFROM

DETAILED DESCRIPTION

Field of the Disclosure

The present disclosure is directed to a conductive ink composition, and in particular, a conductive ink composition including a thermoplastic polyurethane.

Background

Printed Electronics is an emerging industry that aims to print low cost electronic components to add function to otherwise inanimate objects. Unlike conventional electronics, printed electronics are not restricted to rigid substrates.

One application for printed electronics is in the field of packaging. For example, it would be beneficial if electronic circuitry could be printed onto a flat carton-board and then folded into a final shape post-printing and still remain conductive. Other applications that include flexible substrates can also benefit from electronic circuitry that can remain conductive after the substrate is bent.

However, most conductive inks fail in one or more ways when the substrate having the conductive ink printed thereon is bent or creased. For example, the inks can fail because the printed conductive lines do not remain conductive after the carton-board has been folded. Additionally, the inks can fail where the adhesion of the ink to the substrate is insufficient, so that the ink delaminates from the substrate.

Novel conductive inks that are printable and flexible while retaining conductivity upon bending would be a welcome addition in the art.

SUMMARY

An embodiment of the present disclosure is directed to an ink composition. The ink composition comprises: a thermoplastic polyurethane; particles comprising silver; and at least one diluent liquid. The thermoplastic polyurethane has the property of exhibiting an elongation at break ranging from about 200% to about 1500% at 23° C. when in pure polymer form.

Another embodiment of the present disclosure is directed to a method of forming an article of manufacture. The method comprises applying an ink composition to a flexible substrate. The ink composition comprises: a thermoplastic polyurethane; particles comprising silver; and at least one diluent liquid. The thermoplastic polyurethane has the property of exhibiting an elongation at break ranging from about 200% to about 1500% at 23° C. when in pure polymer form. The method further comprises drying the ink composition to form an electrically conductive ink image. The method optionally includes bending the substrate and the electrically conductive ink image.

Yet another embodiment of the present disclosure is directed to an article of manufacture. The article of manufacture comprises a flexible substrate. An electrically conductive ink image is disposed on the flexible substrate. The electrically conductive ink image comprises a thermoplastic polyurethane and particles comprising silver. The thermoplastic polyurethane has the property of exhibiting an elongation at break ranging from about 200% to about 1500% at 23° C. when in pure polymer form.

The conductive ink compositions of the present disclosure have one or more of the following advantages: excellent adhesion to a variety of substrates; the ink is conductive; the ink is flexible after drying; the ink can be screen printed; the ink can be extrusion printed; the ink remains conductive across a crease of a substrate even after flexing multiple times at the crease; the ink is air stable at room temperature; the ink is processed at low temperature; or the ink is made using silver micron-sized flakes and thermoplastic polyurethanes (TPU), which can be relatively inexpensive.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrates embodiments of the present teachings and together with the description, serve to explain the principles of the present teachings.

FIGS. 5A to 5C show digital optical microscope images showing the printed films with three inks before (upper panel) and after (lower panel) bending, as discussed in the examples of the present disclosure. FIG. 5A shows the ink of Example 1 (AgµF with TPU)

It should be noted that some details of the figure have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. In the drawings, like reference numerals have been used throughout to designate identical elements. In the following description, reference is made to the accompanying drawings that form a part thereof, and in which is shown by way of illustration a specific exemplary embodiment in which the present teachings may be practiced. The following description is, therefore, merely exemplary.

Conductive Ink Composition

An embodiment of the present disclosure is related to a conductive ink composition. The ink composition comprises a thermoplastic polyurethane ("TPU") that, in pure polymer form, has an elongation at break ranging from about 200% to about 1500% using ASTM D638 at 23° C. The ink composition further comprises particles comprising silver and at least one diluent liquid.

The thermoplastic polyurethane may be a linear polymer and may optionally have the ability of cross-linking, such as by heat activation or any other suitable crosslinking mechanism. In an example, the thermoplastic polyurethane is a linear polyurethane with an activation temperature for crosslinking ranging from about 50° C. to about 100° C.

The TPU can be in any desired form in the ink, such as either dissolved in the ink diluent liquid or in the form of an emulsion. In embodiments where the thermoplastic polyurethane is in the form of an emulsion, the TPU can be dispersed as particles in the diluent liquid, the TPU and diluent liquid together forming the emulsion. Suitable diluent liquids for the emulsions include carrier liquids, such as, for example, a polar organic liquid, water or both. Suitable polar organic liquids are discussed below. The dispersed TPU particles of the emulsion can be nanoparticles, with sizes ranging, for example, from about 10 nm to about 500 nm, or about 20 nm to about 200 nm, or about 35 nm to about 100 nm, thereby forming a nano-emulsion.

The conductive ink can also include particles comprising silver in any suitable amount that will provide the desired conductivity and that is compatible with the printing technique to be employed. In an embodiment, the dry weight ratio of thermoplastic polyurethane to the particles comprising silver ranges from about 1:30 to about 1:1, such as about 1:25 to about 1:2, or about 1:20 to about 1:4. Dry weight ratios outside of these ranges can also be employed.

Examples of particles comprising silver include particles that are substantially pure silver (e.g., 98 weight % silver or more) and particles made of silver alloys. In an embodiment, the amount of silver in the particles ranges from about 20 weight % silver to 100 weight % silver, such as about 50 weight % silver to about 100 weight % silver, or about 80 weight % silver to 100 weight % silver, or about 90 weight % to 100 weight %, or about 95 weight % to 100 weight % silver.

In an embodiment, the particles are in the form of flakes, such as micro-sized flakes. The term "micron-sized" as used herein refers to particles (e.g., flakes) having a largest dimension with an average size ranging from about 0.1 micron to about 1000 micron. As examples, the micron-sized flakes can have an average size of the largest dimension of each particle ranging from about 0.5 micron to about 100 microns, or about 1 micron to about 10 microns, or about 2 microns to about 4 microns. The size of the micron-sized flakes can be verified using SEM imaging. Types of particles other than flakes that provide the desired conductivity can potentially also be employed. Examples of other types of particles can include fibers, spherical particles or particles of any other shape.

The ink composition can include any suitable amount of the particles comprising silver that will result in the desired conductivity while still providing for the desired flexibility and stretchability characteristics. In an embodiment, the ink composition comprises the particles in an amount ranging from about 10 weight % to about 90 weight %, relative to the total weight of the ink including the diluent liquid, such as about 30 weight % to about 70 weight %, or about 40 weight % to about 60 weight %, relative to the total weight of the ink.

The at least one diluent liquid can be selected to obtain the desired viscosity and working time (e.g., time before the ink dries during printing) for the ink. The diluent liquid is also selected to be compatible with the rest of the system. For example, the at least one diluent liquid can dissolve the TPU or, in the case of an emulsion TPU, act as a suitable continuous phase carrier liquid, and is compatible with the screens (when used for screen printing) and substrates. In an embodiment where the TPU is dissolved in the diluent liquid, example solvents can be selected from the group consisting of propylene glycol methyl ether acetate, 1-phenoxy-2-propanol, Di(propyleneglycol) methyl ether acetate (Di-PGMEA), propylene glycol methyl ether (Di-PGME), Di(propylene glycol)methyl ether, methyl isobutyl ketone, methyl ethyl ketone, diisobutyl ketone, water and mixtures thereof. In other embodiments where the TPU is in the form of an emulsion, the diluent liquid can be any suitable carrier liquid, such as water or polar organic liquids or both. Examples of polar organic liquids include ethylene glycol, diethylene glycol, sulfolane, or mixtures thereof. Any other suitable organic liquids that act as a suitable continuous phase for the emulsion, either alone or in combination with water, can be employed as the carrier liquid in place of, or in addition to, the polar organic liquids.

Any suitable amount of diluent liquid can be employed that will, among other things, provide the desired viscosity for printing, print quality and so forth. As an example, a suitable amount of diluent liquid can be employed so as to result in an ink composition with a solids content ranging from about 20 weight % to about 80 weight %, such as about 30 weight % to about 75 weight % or about 50 weight % to about 70 weight %.

In an embodiment, the ink composition can have a viscosity that is suitable for screen printing or extrusion printing, such as extrusion printing through a syringe applicator. Both screen printing and extrusion printing using a syringe applicator are generally well known in the art. Examples of suitable viscosities range from about 1000 cps to about 500,000 cps, such as about 1000 cps to about 100,000 cps at shear rates ranging from about 40 $s^{-1}$ to about 400 $s^{-1}$, such as about 1 $s^{-1}$ to about 400 $s^{-1}$, and a temperature of 25° C. The viscosity can be determined using an ARES-G2 rheometer from Texas Instruments.

Any other additional ingredients suitable for use in conductive ink compositions can also optionally be included in the compositions of the present disclosure. Examples include one or more optional ingredients selected from adhesion promoters, colorants (e.g., dyes or pigments), dispersants and leveling agents. An example of a suitable adhesion promoter is polyvinyl butyral (PVB). Examples of suitable leveling agents include those comprising silicone, such as BYK-307, BYK-306, BYK-307, BYK-310 BYK-313, BYK-333, BYK-342, BYK-378, BYK-3760 and BYK-Silclean 3700, or combinations thereof. One of ordinary skill in the art would readily be able to determine other ingredients that can be employed.

Ingredients not expressly recited in the present disclosure can be limited and/or excluded from the compositions disclosed herein. Thus, the amounts of the thermoplastic polyurethane ("TPU"), particles comprising silver and at least one diluent liquid, with or without any or all of the optional ingredients as recited herein, can add up to 90% to 100% by weight of the total ingredients employed in the compositions of the present disclosure, such as 95% to 100% by weight, or 98% to 100% by weight, or 99% to 100% by weight, or 99.9% to 100% by weight, or 100% by weight of the total ingredients.

An embodiment of the present disclosure is also directed to a method of forming an article of manufacture. As shown at 100 in the flow chart in FIG. 1, the method comprises applying a conductive ink composition to a flexible substrate 112. In an embodiment, the substrate can optionally be planar, or approximately planar, when the conductive ink composition is applied. In other embodiments, the substrate is not planar when the conductive ink composition is applied. Substrate 112 can optionally include one or more creases 116. The ink composition comprises a thermoplastic polyurethane emulsion; particles comprising silver; and at least one diluent liquid, wherein the thermoplastic polyurethane of the emulsion has the property of exhibiting an elongation at break ranging from about 200% to about 1500% at 23° C. when in pure polymer form. As shown at 102 of FIG. 1, after applying the ink to the flexible substrate, the ink is dried to form an electrically conductive ink image 114 (FIG. 2). Upon drying, the resulting polyurethane binder can form a polymer film that includes the silver particles. The polyurethane binder may or may not be cross-linked, although in some instances cross-linking may be advantageous.

Figure 1:
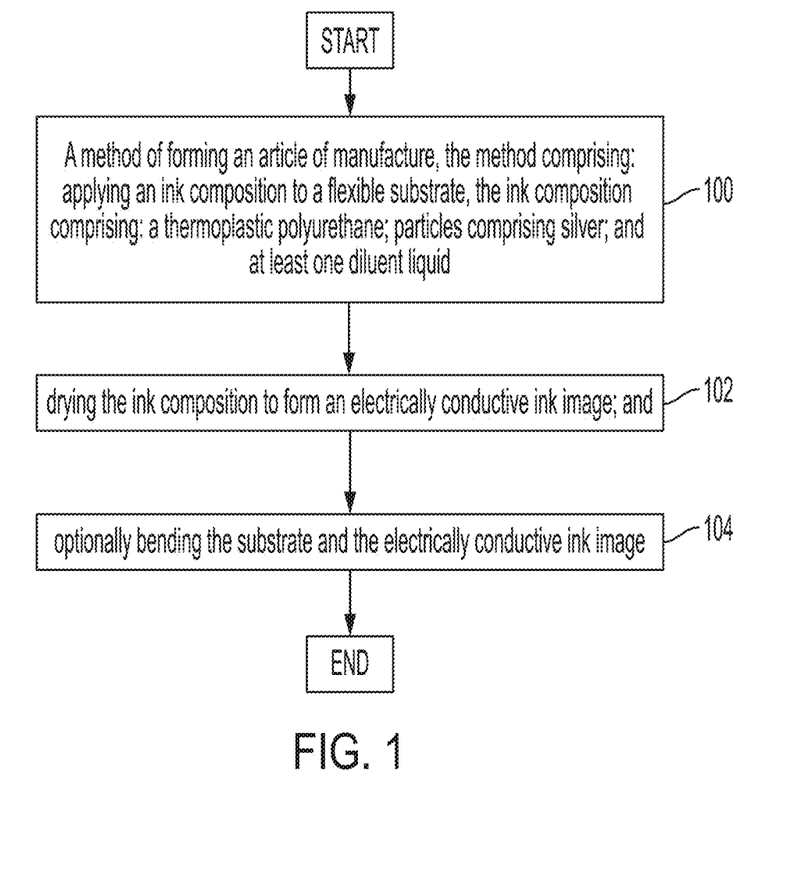
FIG. 1 shows a flowchart of a method of forming an article of manufacture, according to an embodiment of the present disclosure.
Figure 2:
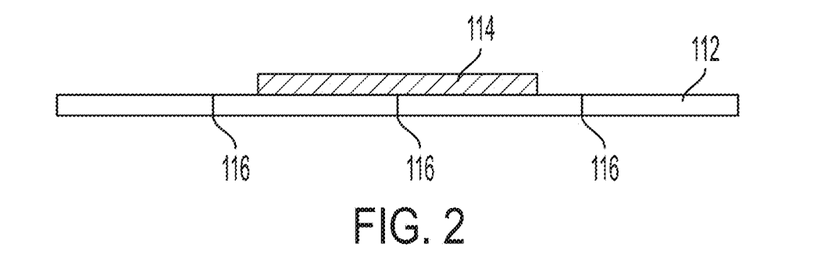
FIG. 2 illustrates a conductive ink image on a flexible substrate, according to an embodiment of the present disclosure.
Figure 3:
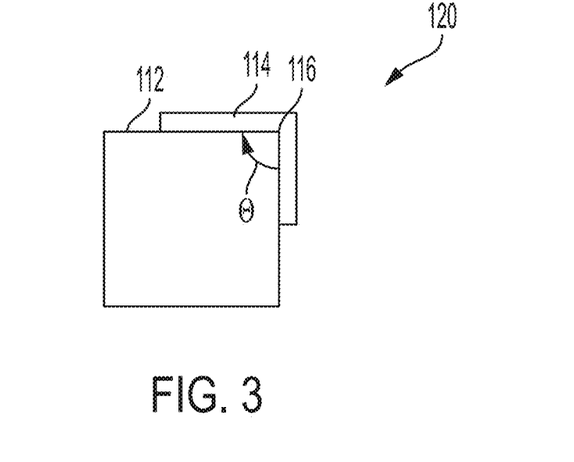
FIG. 3 illustrates the conductive ink image and the flexible substrate of FIG. 2, which have been bent to form an article of manufacture, according to an embodiment of the present disclosure.

After drying, the flexible substrate 112 of FIG. 2, including the electrically conductive ink image 114, can optionally be bent, as shown at 104 of FIG. 1. For example, the substrate 112 including the electrically conductive ink image 114 can be bent to form packaging or any other desired article of manufacture 120, such as is illustrated in FIG. 3. As mentioned above, the bending can result in a crease 116 in the substrate and/or the electrically conductive ink image. The flexible substrate can be bent at any desired angle, e, where the angle is measured relative to the two sides of the substrate 112 on either side of the bend point (shown as crease 116 in FIG. 3) where the bend is occurring, as shown in FIG. 3. Examples of bending angles range from about 0° to about 360°, or about 30° to about 330°, or about 45° to about 315° or about 90° to about 270°. When angle, e, is 180° in FIG. 3, this represents a planar substrate portion across the bend point, shown as optional crease 116. Thus, for purposes of claiming a bend in the final article of manufacture, an angle of 180°, or angles near 180°, such as 175° to 185°, or 170° to 190°, or other angle ranges encompassing 180°, such as 160° to 200°, or 150° to 210°, or 120° to 240°, or 100° to 260°, can optionally be excluded from each of the above ranges for any final angle, e, for article of manufacture 120.

Figure 6:
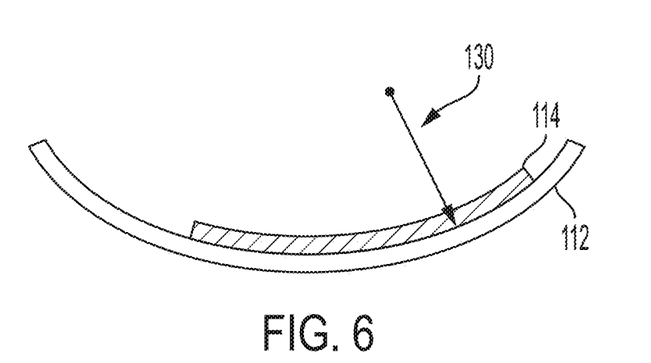
FIG. 6 illustrates a conductive ink image on a flexible substrate having a radius of curvature, according to an example of the present disclosure.

In other embodiments, the substrate 112 may curve sufficiently gently during bending so as not to form a crease 116, as shown in FIG. 6. In such instances the substrate 112 can have any desired radius of curvature 130 after bending, where the radius of curvature is measured at the point on the surface of the substrate 112 with the smallest radius of curvature at which the conductive ink image 114 is formed, the radius of curvature 130 being defined as the radius of a circle which touches the substrate 112 at a given point of the substrate surface on which the conductive ink image 114 is formed and has the same tangent and curvature at that point. Examples ranges for a radius of curvature include from 10 meters to 1 mm, or 1 meter to 1 cm, or 0.5 meters to 2 cm. It is noted that the radius of curvature 130 in FIG. 6 is not necessarily drawn to scale and can be longer or shorter depending on the curve of the substrate 112.

After drying, the ink image is sufficiently flexible and stretchable, so as to allow the ink to remain conductive after flexing multiple times during bending of the flexible substrate. As will be described in detail in the examples below, the conductive ink was printed on a coated carton board that was then creased and flexed along the crease for multiple flexing cycles. The ink demonstrated a relatively small increase in measured resistance across the crease when compared to other tested inks. For example, after 50 flexing cycles, and even after 100, or 200, flexing cycles, the ink can still be electrically conductive across the crease. The term "flexing cycle" as used herein refers to folding along a crease, such as a crease through an ink trace printed on a carton board substrate, where the first cycle includes folding 180° inward and 360° outward and all the remaining cycles include folding 360° inward and 360° outward. Further, the ink has the ability to adhere to the substrate during bending.

After drying, the ink has a volume conductivity ranging from about 1000 S/cm to about 150,000 S/cm, such as about 15,000 S/cm to about 100,000 S/cm, or about 25,000 S/cm to about 100,000 S/cm.

The ink can be applied to the substrate by any suitable printing method. In an embodiment, applying the ink is carried out by screen printing. In another embodiment, applying the ink is carried out by extrusion printing.

FIG. 3 illustrates an article of manufacture 120, according to an embodiment of the present disclosure. The article of manufacture 120 comprises the flexible substrate 112 that has been bent into a desired configuration, such as in the shape of packaging, for example. Electrically conductive ink image 114 is disposed on the flexible substrate 112. The electrically conductive ink image comprises the thermoplastic polyurethane binder and particles comprising silver.

Any suitable substrate can be employed. In an embodiment, the flexible substrate comprises a material selected from the group consisting of paper, carton board, glass, nitrile, polycarbonate and other flexible plastics, and combinations thereof.

In an embodiment, the flexible substrate comprises at least one crease and the electrically conductive ink image is disposed on the at least one crease.

EXAMPLES

Flexible inks formulated with AgµF and TPU were compared with an ink formulated with polyvinyl butyral (PVB), as well as a commercial flexible ink. TPU was used to impart flexibility. The PVB provided a basis of comparison for adhesion, and the commercial flexible ink was used as the commercial benchmark.

The three inks were printed on carton board, which is a representative packaging material/substrate. Conductivity, flexibility, flexing mechanism, adhesion, and dispersion stability have all been investigated. Formulations were not optimized but demonstrate that the performance is superior to the commercial flexible ink.

Two formulations were prepared to assess their performance. The performance of the two formulations were compared to a commercial flexible ink.

Materials Description:

Silver micron-sized flakes (AgµF) were purchased from Inframat Advanced Materials, LLC. The micron-sized flakes used to prepare these inks were ~2-4 µm. Thermoplastic polyurethanes were obtained from various sources, including from Huntsman Corporation: Irostic S 8612 and Irostic S 8743; from Alberdingk Boley, Inc.: Alberdink U615, Alberdink U410, Alberdink U2101; from Covestro: Bayhydrol U2757, Bayhydrol UH2558, and Bayhydrol U2606. Diluent liquids included: Propylene glycol methyl ether acetate (PGMEA), 1-phenoxy-2-propanol, Ethylene glycol, Diethylene glycol and Sulfolane. Additives included a leveling agent, BYK-307.

Example 1: Flex Ink Formulation (TPU Dissolved in Solvent)

3.0 g of AgµF and 3.0 g of 20% TPU (IROSTIC® S 8743, Huntsman) in PGMEA and 1-phenoxy-2-propanol were mixed well in a glass vial using a vortex mixer. The mixture was sonicated for about 1 hour. The concentration of AgµF in the resulting mixture was about 50% by weight. The weight ratio of TPU to AgµF was about 1:5 and the total solid content was about 60% by weight.

Comparative Example A: Flex Ink Formulation 3.0 g AgµF and 3.0 g 20% PVB (Mw=50K, catalogue number 510) in PGMEA and 1-phenoxy-2-propanol were mixed well in a glass vial using a vortex mixer. The mixture was sonicated for 1 hour. The concentration of AgµF in the resulting mixture was about 50% by weight. The weight ratio of TPU to AgµF was about 1:5 and the total solid content was about 60% by weight.

The viscosity of the inks of Examples 1 and 2 are shown in Table 1 below. Unless otherwise stated, all viscosities are for compositions at 25° C.

TABLE 1

The viscosity of the formulated inks with TPU and PVB

| Ink Formulation | Complex Viscosity (40-400 s$^{-1}$) (cps) |
|---|---|
| Example 1 (AgµF + TPU) | 1618.12 |
| Comp. Example A (AgµF + PVB) | 1755.78 |

The inks of Example 1 and Comparative Example A were screen printed using a Single Color Screen Printer. The screen used for printing was prepared by first applying a diazo sensitized emulsion and allowed to air dry. The stencil pattern was transferred onto the screen by exposing the emulsion to a 1000 W Blak-ray long wavelength lamp. The mesh size was 180. The flex inks were cured in an oven at about 120° C. for 20 min (unoptimized conditions). The printed flex inks produced a uniform film of the material.

Comparative Example B

A flexible commercial ink was screen printed using the same procedure described above for Example 1 and Comparative Example A.

Initial conductivity of the printed films of Example 1 and Comparative Example A and Comparative Example B were assessed using a four point probe method. The conductivity and the X-factor (conductivity compared to bulk silver material) are shown in Table 2.

TABLE 2

The conductivity and X-factor of two formulated inks and the commercial flexible ink

| Inks | Conductivity (S/cm) | X-Factor |
|---|---|---|
| Example 1 AgµF + TPU | 1.60E+04 | 39.58 |
| Comp Ex. A AgµF + PVB | 1.63E+04 | 38.82 |
| Comp. Ex. B Commercial flexible ink | 3.31E+04 | 19.01 |

Figure 4:
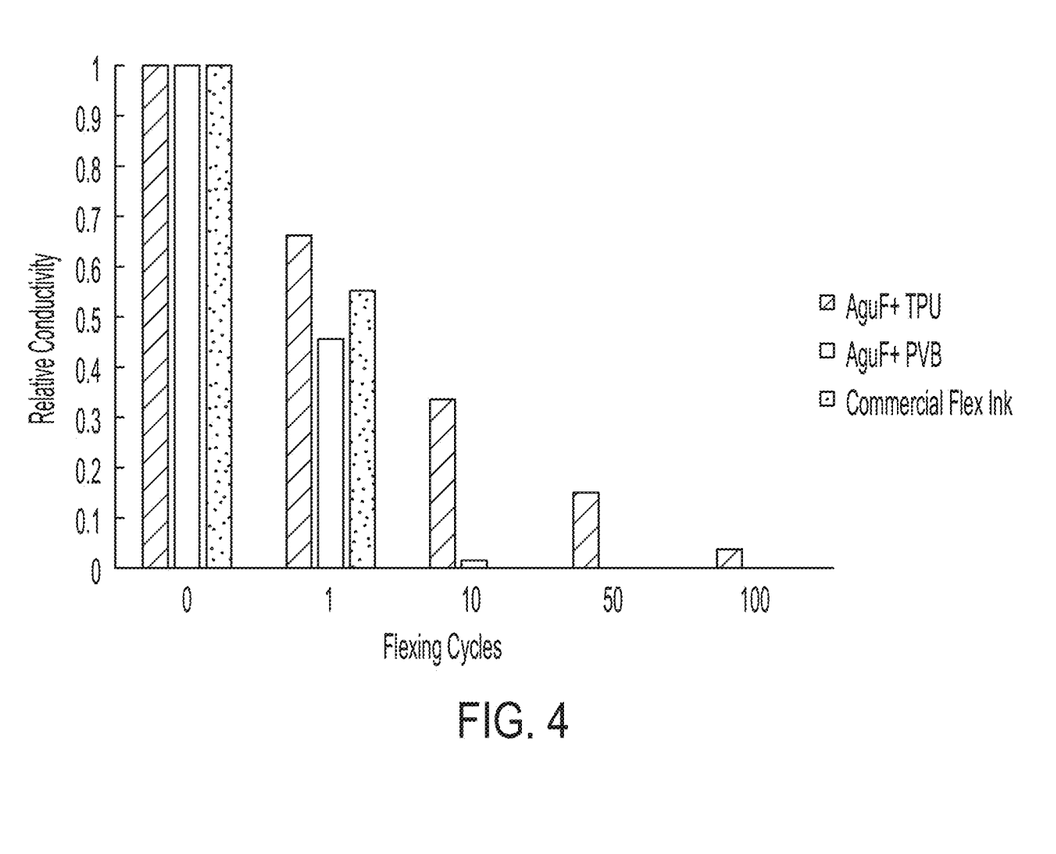
FIG. 4 shows the relative conductivity change over repeated 360° flexing cycles for flexible ink with TPU, with PBV, and a commercial flexible ink, as discussed in the examples of the present disclosure.

The three printed inks of Example 1, Comparative Example A and Comparative Example B were tested for their flexibility by folding the carton board 180° inward and then 360° outward, followed by multiple cycles of folding 360° inward and then 360° outward. The relative conductivity changes across the crease of the three inks were compared over 100 flexing cycles, as presented in FIG. 4. All the three inks performed similarly after 1 folding cycle. However, after 10 cycles, the PVB ink of Comparative Example A decreased dramatically in conductivity (e.g., after the flexing cycles, the conductivity was only 2% of the original conductivity before the flexing cycles), but still demonstrated some marginal conductivity, whereas the commercial flexible ink of Comparative Example B had completely lost its conductivity. The PVB ink of Comparative Example A also lost conductivity after 50 flexing cycles, while the TPU ink of Example 1 was still quite conductive (measured resistance from initial 3.2Ω to a modest 57Ω, as shown in Table 3) even after 100 flexing cycles, showing excellent flexibility and robustness.

TABLE 3

Resistance values of the three screen printed inks from 0 up to 100 folding cycles.

| Inks | 0 cycle | 1 cycle | 10 cycles | 50 cycles | 100 cycles |
|---|---|---|---|---|---|
| Example 1 | 2.2 Ω | 3.3 Ω | 6.4 Ω | 14.3 Ω | 57.0 Ω |
| Comp. Ex. A | 2.2 Ω | 4.9 Ω | 143.0 Ω | Infinite | Infinite |
| Comp. Ex. B | 1.9 Ω | 3.8 Ω | Infinite | Infinite | Infinite |

Figure 5A:
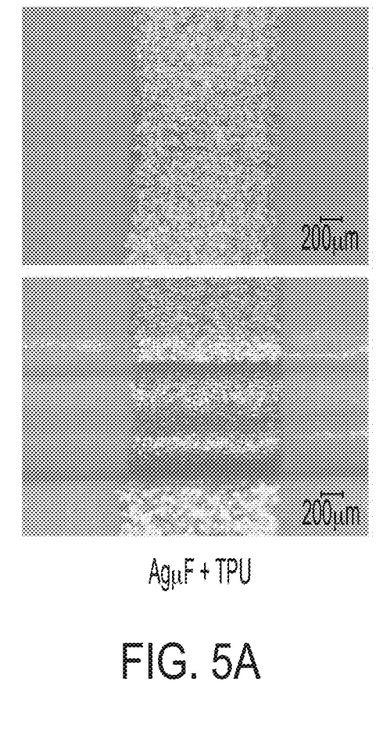
Figure 5B:
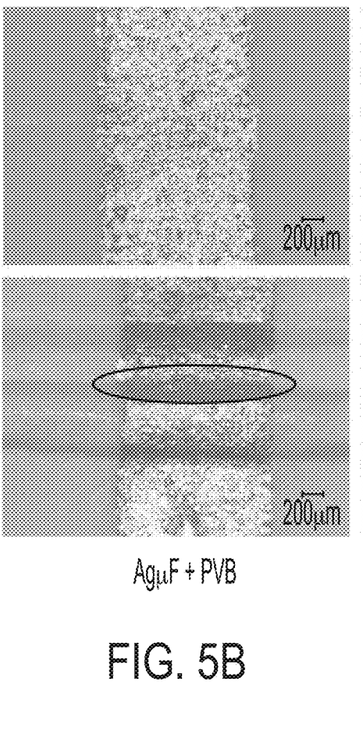
FIG. 5B shows the ink of Comparative Example A (AgµF with polyvinyl butyral (PVB))
Figure 5C:
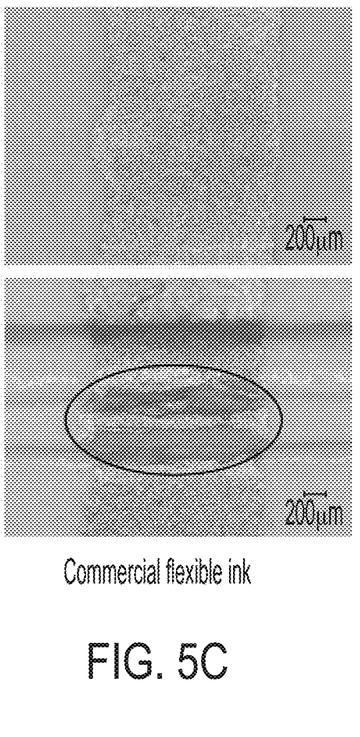
FIG. 5C shows the ink of Comparative Example B (a commercial flexible ink). The circles highlight the cracked and peeled off areas of the films.

To investigate the mechanism of the difference in flexibility among the three types of inks, optical microscope images of the printed lines were taken before and after 100 cycles of flexing test. Before folding, the films printed with the three inks are all uniform and continuous. As shown in FIGS. 5A to 5C, after 100 flexing cycles at the crease, the AgµF and TPU ink of Example 1 (FIG. 5A) still adhered to the substrate strongly and remained crack-free, while the ink with PVB of Comparative Example A (FIG. 5B) showed some cracking and peeling at the creases, and large pieces of the ink of Comparative Example B (FIG. 5C) peeled off at the flexed areas, leaving huge gaps in the printed lines. The circled areas in FIGS. 5B and 5C show the cracked and peeling areas of the inks. These observations explained why the ink of Example 1 exhibits higher flexibility than the other two inks. The excellent adhesion and flexibility of the TPU of Example 1 make it a good binder for flexible inks.

The adhesion of the ink of Example 1 and the ink of Comparative Example B was assessed by scoring the square patches in a cross-hatched pattern with a scalpel blade, then applying scotch tape over the scored patch, and peeling off the tape. The amount of transfer of the printed material onto the tape indicates the adhesiveness of the ink. An established SIR chart quantifies the adhesiveness on 5 levels:

1. No adhesion—all the ink transfers to the tape.
2. Low adhesion—most of the ink transfers to the tape.
3. Partial adhesion—the ink is evenly split between the substrate and the tape.
4. Excellent adhesion—very little ink transfers to the tape.
5. Perfect adhesion—none of the ink transfers to the tape.

TABLE 4

The adhesion comparison of the ink of Example 1 with the
ink of Comparative Example B on various substrates.

| Substrate | Ink of Example 1 | Ink of Comp. Ex. B |
|---|---|---|
| Glass | 4 | 4 |
| Polycarbonate | 4 | 4 |
| Polyvinyl | 4 | 3 |
| PET | 4 | 4 |
| Nitrile | 2 | 2 |

Adhesion of the inks of Example 1 and Comparative Example B was measured on various substrates including glass, polycarbonate, polyvinyl, polyethylene terephthalate (PET), and nitrile. The adhesion strength was very similar for both inks. They both have good adhesion on glass, polycarbonate, PET, and polyvinyl sticker, but poor adhesion on nitrile. The adhesion of the ink of Example 1 could be further optimized, if desired, in many different ways, such as by increasing the loading of the TPU, heating to a higher temperature (>120° C.) to induce self-cross linking of the TPU, or heating at 120° C. or lower for a longer time to cross-link.

The ink of Example 1 was monitored over time for dispersion stability. It was found that the ink was stable for at least 4 hours at room temperature. The dispersion stability can be further improved by addition of a suitable dispersant.

Examples 2 to 9 (TPU Nanoparticle Emulsions)

TPU nanoparticle emulsions were also used as binders for flexible inks and have demonstrated both strong adhesion and cohesion. Ink formulations of Examples 2 to 9, which employed several different commercial TPU nanoparticle aqueous emulsions and an organic liquid, are shown in Table 5. The conductivity and flexibility of the resulting conductive ink of Examples 2 to 9 were similar to those with the dissolved TPU formulations of Example 1.

In example 9, 2% by weight of a leveling agent, BYK 307, was included in the formulation. The inks of Examples 2 to 9 are considered printable with an extrusion printer or by screen printing. Additives, such as leveling agents can optionally be added to any of the examples herein to modify the ink properties.

TABLE 5

Conductive Ink formulations employing nano-emulsion TPU and silver particles.

| Example | Conductive Particle | Aqueous TPU Emulsion | Diluent Liquid | Additives |
|---|---|---|---|---|
| 2 | AgμF (1.0 g) | Alberdink U615 (0.6 g) | Diethylene glycol (0.4 g) | NA |
| 3 | AgμF (1.0 g) | Alberdink U615 (0.8 g) | Sulfolane (0.2 g) | NA |
| 4 | AgμF (1.0 g) | Alberdink U410 (0.6 g) | Diethylene glycol (0.4 g) | NA |
| 5 | AgμF (1.0 g) | Alberdink U2101 (0.8 g) | Ethylene glycol (0.2 g) | NA |
| 6 | AgμF (1.0 g) | Bayhydrol U2757 (0.5 g) | Ethylene glycol (0.5 g) | NA |
| 7 | AgμF (1.0 g) | Bayhydrol UH2558 (0.5 g) | Ethylene glycol (0.5 g) | NA |
| 8 | AgμF (1.0 g) | Bayhydrol U2606 (0.5 g) | Ethylene glycol (0.5 g) | NA |
| 9 | AgμF (0.36 g) | Alberdink U615 (0.33 g) | Sulfolane (0.31g) | BYK 307 (0.02 g) |

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. An ink composition, comprising:
   a thermoplastic polyurethane;
   particles comprising silver; and
   at least one diluent liquid, the thermoplastic polyurethane and the at least one diluent liquid together being in the form of an emulsion,
   wherein the thermoplastic polyurethane has the property of exhibiting an elongation at break ranging from about 200% to about 1500% at 23° C. when in pure polymer form.

2. The composition of claim 1, wherein the thermoplastic polyurethane is a linear polyurethane with an activation temperature ranging from about 50° C. to about 100° C.

3. The compositions of claim 1, wherein the thermoplastic polyurethane is a dispersed phase of the emulsion and the diluent liquid is a continuous phase comprising at least one carrier liquid chosen from water and an organic liquid.

4. The composition of claim 1, wherein the dry weight ratio of thermoplastic polyurethane to the particles ranges from about 1:30 to about 1:1.

5. The composition of claim 1, wherein the particles are in the form of micron-sized flakes.

6. The composition of claim 1, wherein the amount of silver in the particles ranges from about 20% silver to 100% silver.

7. The composition of claim 1, wherein the particles comprising silver are in an amount ranging from about 20 weight % to about 90 weight %, relative to the total weight of the ink.

8. The composition of claim 1, wherein the at least one diluent liquid is selected form the group consisting of ethylene glycol, diethylene glycol, sulfolane and mixtures thereof.

9. The composition of claim 1, wherein the viscosity of the ink ranges from about 1000 cps to about 500,000 cps at shear rates ranging from about 40 $s^{-1}$ to about 400 $s^{-1}$ and a temperature of 25° C.

10. The composition of claim 1, further comprising one or more optional ingredients selected from the group consisting of adhesion promoters, colorants, dispersants and leveling agents.

11. An ink composition, comprising:
a thermoplastic polyurethane;
particles comprising silver, the dry weight ratio of thermoplastic polyurethane to the particles ranges from about 1:30 to about 1:1; and
at least one diluent liquid, the thermoplastic polyurethane and the at least one diluent liquid together being in the form of an emulsion,
wherein the thermoplastic polyurethane has the property of exhibiting an elongation at break ranging from about 200% to about 1500% at 23° C. when in pure polymer form,
wherein the thermoplastic polyurethane is a linear polyurethane with an activation temperature ranging from about 50° C. to about 100° C.

12. The composition of claim 11, wherein the dry weight ratio of thermoplastic polyurethane to the particles ranges from about 1:20 to about 1:4.

13. The composition of claim 12, wherein the particles comprising silver are in an amount ranging from about 20 weight % to about 90 weight %, relative to the total weight of the ink.

14. The composition of claim 13, wherein the at least one diluent liquid is selected form the group consisting of ethylene glycol, diethylene glycol, sulfolane and mixtures thereof.

15. The composition of claim 13, wherein the viscosity of the ink ranges from about 1000 cps to about 500,000 cps at shear rates ranging from about 40 $s^{-1}$ to about 400 $s^{-1}$ and a temperature of 25° C.

16. A method of forming an article of manufacture, the method comprising:
applying an ink composition to a flexible substrate, the ink composition comprising:
a thermoplastic polyurethane;
particles comprising silver; and
at least one diluent liquid, the thermoplastic polyurethane and the at least one diluent liquid together being in the form of an emulsion;
wherein the thermoplastic polyurethane has the property of exhibiting an elongation at break ranging from about 200% to about 1500% at 23° C. when in pure polymer form;
drying the ink composition to form an electrically conductive ink image; and
optionally bending the substrate and the electrically conductive ink image.

17. The method of claim 16, wherein the electrically conductive ink image has the property of being sufficiently flexible so as to remain electrically conductive across a crease in the event that 50 flexing cycles are carried out at the crease.

18. The method of claim 16, wherein the electrically conductive ink image has a volume conductivity ranging from about 1000 S/cm to about 150,000 S/cm.

19. The method of claim 16, wherein applying the ink composition is carried out by screen printing.

20. The method of claim 16, wherein applying the ink composition is carried out by extrusion printing through a syringe applicator.

* * * * *